US010192467B2

(12) United States Patent
Eisele et al.

(10) Patent No.: US 10,192,467 B2
(45) Date of Patent: Jan. 29, 2019

(54) TAMPER-EVINCING SEAL ASSEMBLY, SYSTEM, AND METHOD

(71) Applicant: THE BOEING COMPANY, Chicago, IL (US)

(72) Inventors: Gregory Thomas Eisele, Everett, WA (US); Jeremy Edward Templeton, Everett, WA (US)

(73) Assignee: The Boeing Company, Chicago, IL (US)

( * ) Notice: Subject to any disclaimer, the term of this patent is extended or adjusted under 35 U.S.C. 154(b) by 23 days.

(21) Appl. No.: 15/627,511

(22) Filed: Jun. 20, 2017

(65) Prior Publication Data

US 2018/0366038 A1 Dec. 20, 2018

(51) Int. Cl.

| | |
|---|---|
| ***B32B 3/24*** | (2006.01) |
| ***G09F 3/00*** | (2006.01) |
| *G09F 3/10* | (2006.01) |

(52) U.S. Cl.

CPC .............. *G09F 3/0292* (2013.01); *G09F 3/10* (2013.01)

(58) Field of Classification Search

CPC ..................................................... G09F 3/0292
USPC ........................................................... 428/43
See application file for complete search history.

(56) References Cited

U.S. PATENT DOCUMENTS 4,394,904 A * 7/1983 Larimore .............. A61F 15/001 206/390
6,447,015 B1 9/2002 Linnewiel
7,722,517 B2 5/2010 Chen

FOREIGN PATENT DOCUMENTS

WO WO 2005/039869 5/2005

* cited by examiner

*Primary Examiner* — Brent T O'Hern
(74) *Attorney, Agent, or Firm* — Joseph M. Butscher; The Small Patent Law Group, LLC

(57) ABSTRACT

A tamper-evincing seal assembly is configured to be secured to a component to indicate tampering of the component. The tamper-evincing seal assembly includes a curling member that is configured to lie flat in a tamper-free state, and outwardly curl in a tampered state.

32 Claims, 7 Drawing Sheets

TAMPER-EVINCING SEAL ASSEMBLY, SYSTEM, AND METHOD

FIELD OF THE DISCLOSURE

Embodiments of the present disclosure generally relate to tamper-evincing seal assemblies, systems, and methods, and, more particularly, to seal assemblies, systems, and methods that are configured to provide noticeable and unambiguous indications of tampering of components.

BACKGROUND OF THE DISCLOSURE

Certain components are used to securely contain or otherwise retain different types of items. Such components include, but are not limited to, compartments aboard vehicles, medical kits that contain medical devices, hazardous waste containers, fuel-dispensing stations, automated teller machines (ATMs), casino games (such as slot machines), food containers, and/or the like. For various reasons, it is desired to ensure that the components are not subjected to tampering. For example, aboard an aircraft, flight operations personnel may inspect stowage compartments to ensure that contraband is not smuggled aboard and stowed therein. As another example, used medical supplies (such as hypodermic needles) are safely stored in a sealed container. As another example, ATMs are securely closed to ensure that unscrupulous individuals do not steal money contained therein.

Interior compartments of aircraft are subject to various regulations, such as those promulgated by the United States Federal Aviation Administration (FAA). One or more applicable compartments in an aircraft may be required to incorporate a design feature that facilitates discovery of unauthorized tampering of the compartment. Typically, a tamper feature is secured on the compartment. Padlocks and stickers are common tamper features that may be secured to compartments aboard an aircraft. A padlock may be an obtrusive structure that may interfere with operation of certain compartments. Various stickers may be installed on compartments as tamper-evident features. However, certain known stickers may not satisfy standards of review of certain regulatory agencies, such as the FAA. In particular, due to aircraft lighting conditions, container orientation, and seal installation location, it may be difficult to discern tamper-indicating features secured to compartments.

SUMMARY OF THE DISCLOSURE

A need exists for a tampering-indicating sticker that provides a tamper-evincing indication that is quickly, easily, and readily discernable.

With those needs in mind, certain embodiments of the present disclosure provide a tamper-evincing seal assembly that is configured to be secured to a component to indicate tampering of the component. The tamper-evincing seal assembly includes a curling member that is configured to lie flat in a tamper-free state, and outwardly curl in a tampered state. The curling member may include one or more of a spring member (such as formed of plastic and/or metal) or a shape memory alloy.

In at least one embodiment, the curling member includes a first portion and a second portion. The first portion and the second portion outwardly curl away from each other in the tampered state. The outwardly curled first and second portions are separated by an expanded separation gap in the tampered state. In at least one embodiment, the first portion is connected to the second portion in the tamper-free state, and the first portion disconnects from the second portion in the tampered state. In one example, the first portion connects to the second portion at a weakened area in the tamper-free state, and the weakened area is broken in the tampered state.

The tamper-evincing seal assembly may include a cover layer having a split connection. The split connection splits open in the tampered state. In at least one embodiment, the cover layer overlays the curling member in the tamper-free state. The curling member causes the cover layer to outwardly curl as the split connection splits open in the tampered state. The curling member may be embedded in the cover layer.

In at least one embodiment, the tamper-evincing seal assembly includes an adhesive layer that is configured to secure the curling member to the component. The adhesive layer may include a first substrate, and a second substrate separated from the first substrate by a gap. Anchored sections of the curling member are mounted on the first and second substrates, and curling sections of the curling member are over the gap in the tamper-free state.

The tamper-evincing seal assembly may include a first indicator indicative of the tamper-free state when exposed, and a second indicator indicative of the tampered state when exposed. In at least one embodiment, the first indicator is on a first surface of the curling member, and the second indicator is on a second surface of the curling member that is opposite from the first surface.

The curling member is configured to outwardly curl in response to exertion of an external stimulus of sufficient magnitude. The external stimulus may be one or more of a force or temperature.

Certain embodiments of the present disclosure provide a method of indicating tampering of a component. The method includes affixing a tamper-evincing seal assembly to the component, providing a flattened curling member of the tamper-evincing seal assembly in a tamper-free state, and outwardly curling the curling member in a tampered state.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a tamper-evincing seal assembly that may be used in commercial aerospace interior applications. The tamper-evincing seal assembly may also be used in various other settings in which detection of component tampering is important. For example, the tamper-evincing seal assembly may be used with respect to various components, such as compartment/containers aboard a vehicle (such as a commercial aircraft), medical systems, containers, kits, and the like, food containers and storage systems, fuel-dispensing systems, banking machines (such as ATMs), casino games (such as slot machines), hazardous waste containers, and/or the like.

In at least one embodiment, the tamper-evincing seal assembly is configured to outwardly curl when a perforation is broken. The curling is "outward" in that it is directed away from a weakened area towards an uncurled end. The outward curling of the tamper-evincing seal assembly provides a clear, noticeable, and unambiguous indication that a component on which the tamper-evincing seal assembly is secured has been subjected to tampering. The outward curling provides a robust indication of tampering, because portions of the seal assembly spread apart, thereby exposing a clear gap between outwardly-curled portions.

Figure 1:
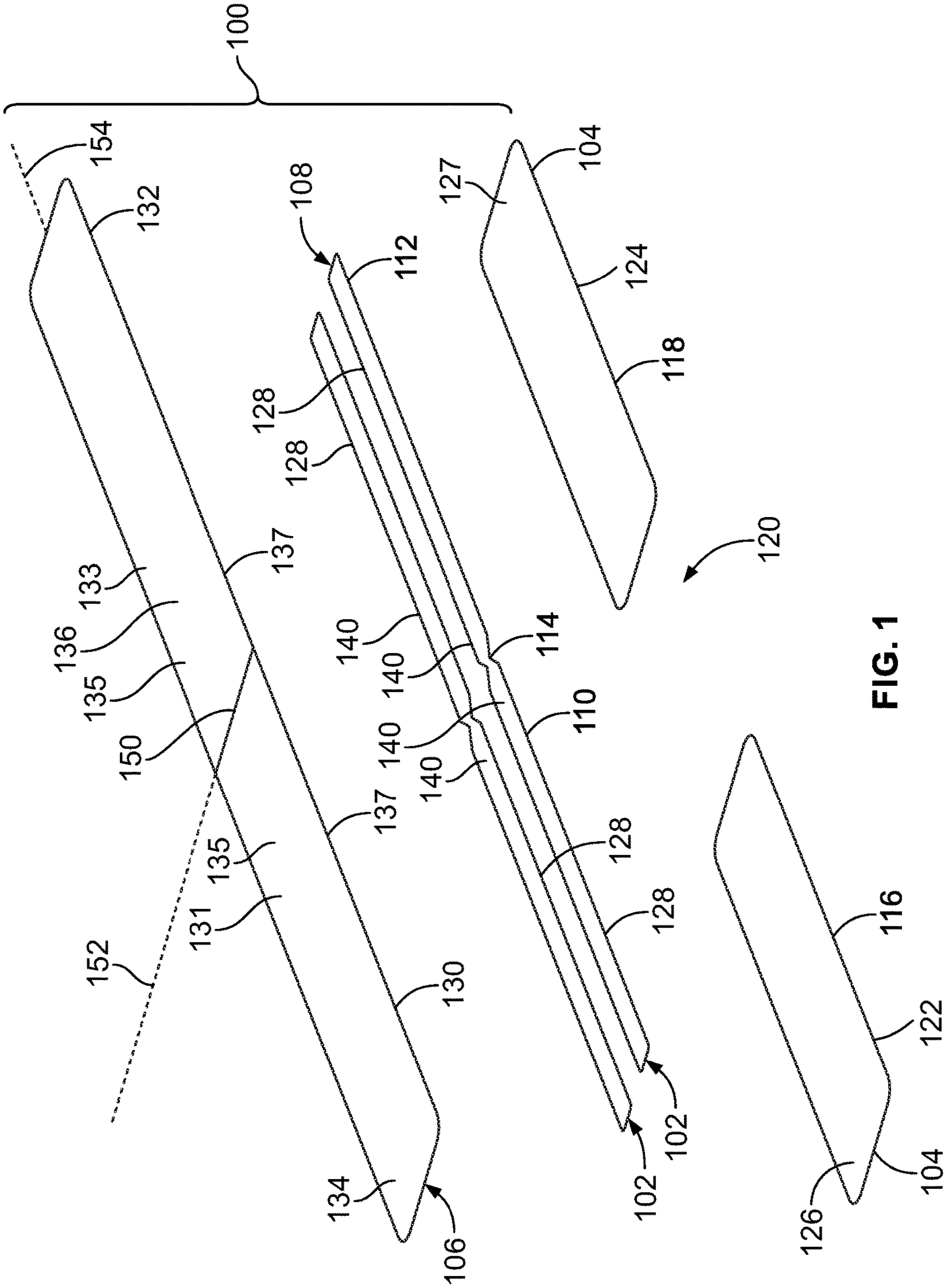
FIG. 1 is a diagrammatic representation of a top perspective exploded view of a tamper-evincing seal assembly, according to an exemplary embodiment of the present disclosure.

FIG. 1 is a diagrammatic representation of a top perspective exploded view of a tamper-evincing seal assembly 100, according to an exemplary embodiment of the present disclosure. The tamper-evincing seal assembly 100 is configured to be secured to a component in order to provide a clear, noticeable, unambiguous indication of tampering with the component.

The tamper-evincing seal assembly 100 includes one or more curling members 102 disposed between an adhesive layer 104 and a cover layer 106. Each of the curling members 102 includes a longitudinal strip 108 having a first portion 110 (such as a first half) connected to a second portion 112 (such as a second half) at a central weakened area 114, such as a perforation, a reduced width area, and/or the like. The first portion 110 and the second portion 112 are formed of material that is configured to exert an outwardly-curled force away from the weakened area 114. For example, the first and second portions 110 and 112 may be plastic and/or metallic spring leafs, beams, strips, straps, tabs, or the like that are configured to exert an outwardly-curled force away from the weakened area 114. As another example, the first and second portions 110 and 112 may be shape-memory alloys that are configured to exert an outwardly-curled force away from the weakened area 114, and/or when subjected to a change in ambient conditions (such as a change a temperature, pressure, or the like). In at least one embodiment, the first and second portions 110 and 112 may not be connected at the weakened area 114. Instead, the weakened area 114 may be replaced with a gap, such that opposite ends of the first and second portions 110 and 112 abut against one another, and are held flat by the cover layer 106, which may include a weakened area.

The first portion 110 is connected to the second portion 112 in the tamper-free state, such that the curling member 102 provides a flat, unitary strip. The first portion 110 disconnects from the second portion 112 in the tampered state, such that curling sections 140 of the first and second portions 110 and 112 outwardly curl away from one another. In the tamper-free state, the first portion 110 connects to the second portion 112 at the weakened area 114, to provide a flat strip of material. In the tampered-state, the weakened area 114 is broken, and the curling sections 140 of the first and second portions 110 and 112 outwardly curl away from one another.

As shown, the tamper-evincing seal assembly 100 includes two parallel curling members 102, each of which includes first and second portions 110 and 112. Optionally, the tamper-evincing seal assembly 100 may include a single curling member 102, or more than two curling members 102.

The curling members 102 overlay portions of the adhesive layer 104. The adhesive layer 104 includes a first adhesive substrate 116 and a second adhesive substrate 118 separated by a gap 120. The first and second adhesive substrates 116 and 118 are configured to adhesively secure to a component. For example, bottom surfaces 122 and 124 of the first and second substrates 116 and 118, respectively, include adhesives that adhesively secure to a component. Top surfaces 126 and 127 of the first and second substrates 116 and 118, respectively, provide a mounting surface for anchored sections 128 of the first and second portions 110 and 112 of the curling members 102. In at least one embodiment, the first and second adhesive substrates 116 and 118 may be double-sided tape, that adhesively secure to both a component and the anchored sections 128 of the first and second portions 110 and 112 of the curling members 102. Optionally, the first and second adhesive substrates 116 and 118 may provide adhesive only on the bottom surfaces 122 and 124. In such case, for example, a securing agent (such as an adhesive) may be provided between the anchored sections 128 and the top surfaces 126 and 127. For example, an adhesive layer (such as a glue) may be affixed to the top surfaces 126 and 127 underneath the anchored sections 128. As another example, double sided tape may be sandwiched between the top surfaces 126 and 128 and the anchored sections 128.

The anchored sections 128 of the first and second portions 110 and 112 are sandwiched and flattened between the top surfaces 126 and 127 of the first and second substrates 116 and 118, and bottom surfaces 130 and 132 of first and second portions 134 and 136 (such as first and second halves), respectively, of the cover layer 106. Optionally, the curling members 102 may be embedded with the cover layer 106. The anchored sections 128 of the first and second portions 110 and 112 connect to and may be integrally formed with curling sections 140 of the first and second portions 110 and 112 of the curling members 102. The curling sections 140 are positioned underneath the bottom surfaces 130 and 132 of the cover layer 106, and over the gap 120 between the first and second adhesive substrates 116 and 118. As such, the curling sections 140 do not abut against the top surfaces 126 and 127 of the first and second adhesive substrates 116 and 118. Alternatively, the curling sections 140 may abut against the top surfaces 126 and 127, such as if there is no adhesive between the curling sections 140 and the top surfaces 126 and 127.

The cover layer 106 may be formed of a plastic, cloth, film, paper, and/or adhesive material. The cover layer 106 includes the first and second portions 134 and 136 divided by a split connection 150, such as a score line or other such perforation. As shown, the split connection 150 may be aligned with and on a lateral axis 152 of the cover layer 106 that divides the first and second portions 134 to 136 into equal halves. Optionally, the split connection 150 may be offset from the lateral axis. In at least one embodiment, the split connection 150 may be aligned with a longitudinal axis 154 of the cover layer 106. In at least one other embodiment, the split connection 150 may not be aligned with or parallel with either the lateral axis 152 or the longitudinal axis 154.

The curling members 102 may be sandwiched between the adhesive layer 104 and the cover layer 106, such that the weakened areas 114 are directly underneath the split connection 150. Optionally, the curling member 102 may be oriented differently, such that weakened areas are underneath a split connection 150 that is aligned with the longitudinal axis 154.

In at least one embodiment, top surfaces 131 and 133 of the first and second portions 134 and 136 of the cover layer 106 may include a first indicator 135 that differs from a second indicator 137 on the bottom surfaces 130 and 132. For example, the first indicator 135 may be a first color (such as green) while the second indicator 137 may be a second color (such as red). The second color is exposed, such as when the first and second portions 134 and 136 curl apart when the split connection 150 breaks, during a tampered state. When the second color is not exposed, the tamper-evincing seal assembly 100 is in a tamper-free state. The first and second indicators 135 and 137 may be different colors, graphics, text, or the like that differentiate between a tamper-free state and a tampered state. The differences between the first and second indicators provide a visual contrast that allows an individual to differentiate between a tamper-free state and a tampered state. Optionally, the top surfaces 131/133 and the bottom surfaces 134/136 may not include different indicators. In at least one other embodiment, the different indicators may be on the curling members 102.

Figure 2:
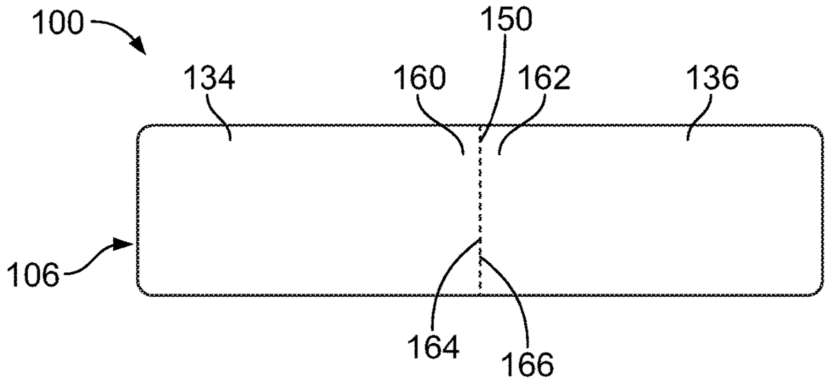
FIG. 2 is a diagrammatic representation of a top view of a tamper-free tamper-evincing seal assembly, according to an exemplary embodiment of the present disclosure.

FIG. 2 is a diagrammatic representation of a top view of a tamper-free tamper-evincing seal assembly 100, according to an exemplary embodiment of the present disclosure. In a tamper-free state, the split connection 150 couples opposite ends 160 and 162 of the first and second portions 134 and 136, respectively, together. The split connection 150 may be formed through scoring, which forms a plurality of linearly-aligned perforations 164 separated by connections 166.

Figure 3:
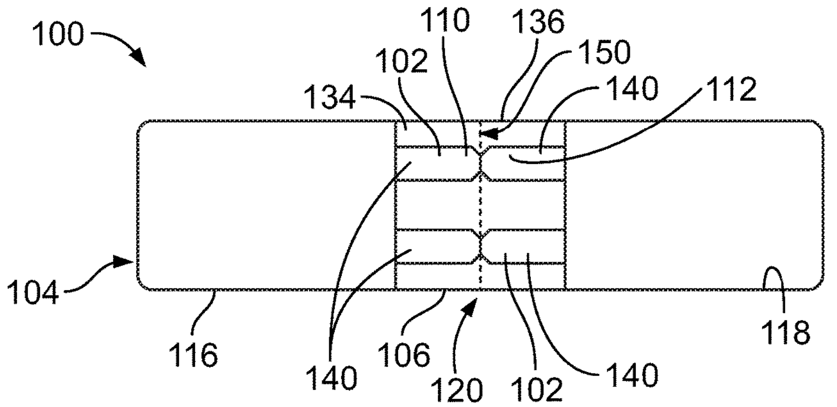
FIG. 3 is a diagrammatic representation of a bottom view of a tamper-free tamper-evincing seal assembly, according to an exemplary embodiment of the present disclosure.

FIG. 3 is a diagrammatic representation of a bottom view of the tamper-free tamper-evincing seal assembly 100, according to an exemplary embodiment of the present disclosure. The split connection 150 is formed so as to hold the curling sections 140 of the curling members 102 flat in the tamper-free state. That is, the split connection 150 is strong enough to ensure that the curling members 102 remain flat in the tamper-free state. When sufficient force is exerted to break the split connection 150, the force outwardly-exerted by the curling sections 140 of the curling members 102 causes the curling sections 140 and the first and second portions 134 and 136 of the cover layer 106 to outwardly curl away from the area of the split connection 150. The sufficiency of the force to break the split connection 150 is predetermined, as desired. For example, depending on a particular application, the split connection 150 is configured to break upon exertion of a desired amount of force.

Figure 4:
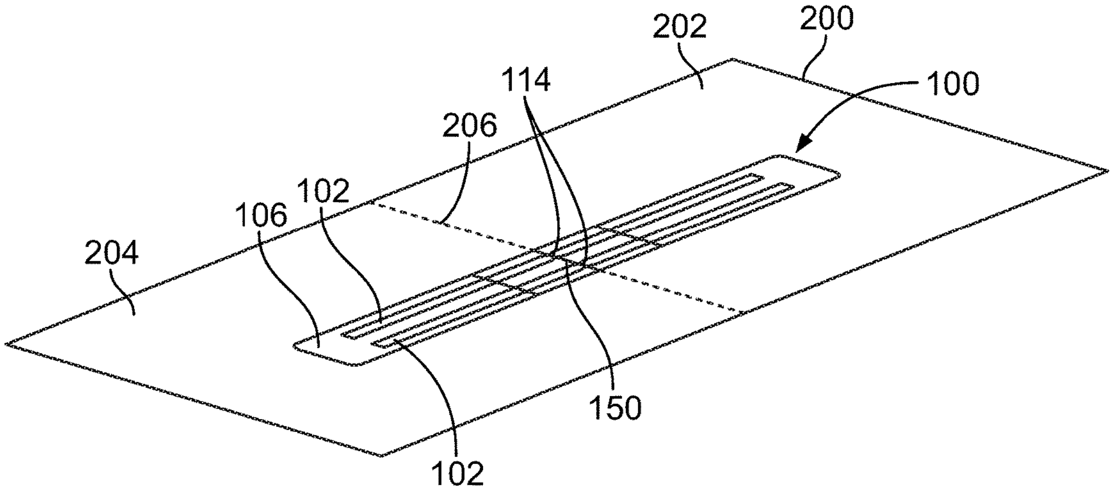
FIG. 4 is a diagrammatic representation of a top perspective view of a tamper-evincing seal assembly secured to a component in a tamper-free state, according to an exemplary embodiment of the present disclosure.

FIG. 4 is a diagrammatic representation of a top perspective view of the tamper-evincing seal assembly 100 secured to a component 200 in a tamper-free state, according to embodiment of the present disclosure. Examples of the component 200 include, but are not limited to, a compartment/containers aboard a vehicle (such as a life vest container onboard a commercial aircraft), a medical system, container, kit, or the like, a food container or storage system, a fuel-dispensing system, a banking machine (such as an ATM), a casino game (such as a slot machine), a hazardous waste container, a smoke detector, and/or the like. In at least one embodiment, the component 200 includes a first portion 202 connected to a second portion 204 at an interface 206. The first and second portions 202 and 204 may be configured to move relative to one another in relation to the interface 206. For example, the first portion 202 may be a box or container, while the second portion 204 is a door that opens relative to the first portion 202 at the interface 206.

In at least one embodiment, the tamper-evincing seal assembly 100 is mounted over the component 200 so that the gap 120 between the adhesive substrates 116 and 118 (shown in FIGS. 1 and 3), the weakened areas 114 of the curling members 102, and the split connection 150 are aligned over the interface 206. In this manner, when the first and second portions 202 and 204 of the component 200 are opened in relation to the interface 206, the opening therebetween causes the weakened areas 114 and the split connection 150 to break. In at least one other embodiment, the tamper-evincing seal assembly 100 may be mounted to various other areas of the component 200. Optionally, the component 200 may not include an interface between first and second portions.

Figure 5:
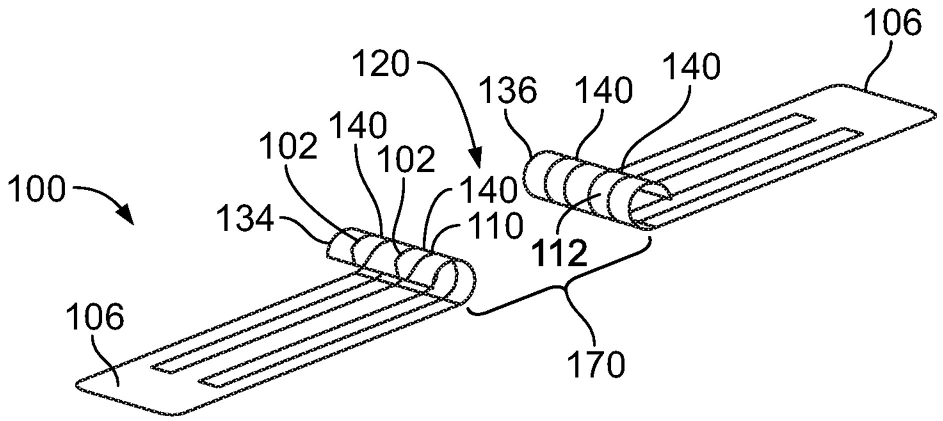
FIG. 5 is a diagrammatic representation of a top perspective view of a tamper-evincing seal assembly in a tampered state, according to an exemplary embodiment of the present disclosure.
Figure 6:
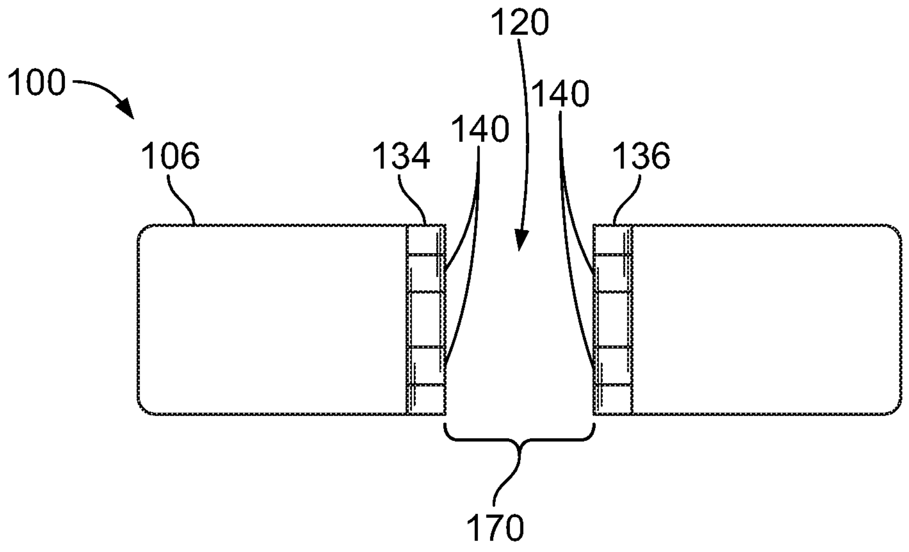
FIG. 6 is a diagrammatic representation of a top view of a tamper-evincing seal assembly in a tampered state, according to an exemplary embodiment of the present disclosure.
Figure 7:
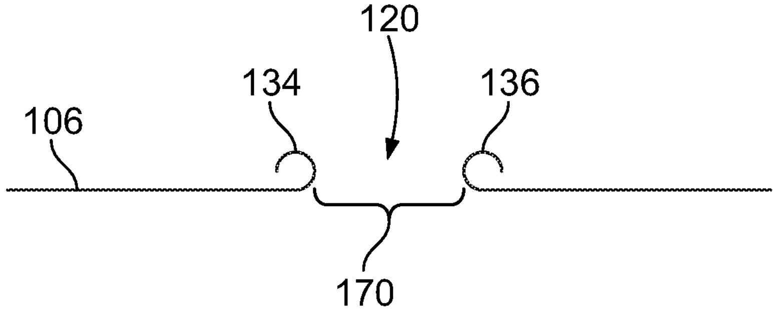
FIG. 7 is a diagrammatic representation of a lateral view of a tamper-evincing seal assembly in a tampered state, according to an exemplary embodiment of the present disclosure.

FIG. 5 is a diagrammatic representation of a top perspective view of the tamper-evincing seal assembly 100 in a tampered state, according to an exemplary embodiment of the present disclosure. FIG. 6 is a diagrammatic representation of a top view of the tamper-evincing seal assembly 100 in the tampered state. FIG. 7 is a diagrammatic representation of a lateral view of the tamper-evincing seal assembly 100 in the tampered state. Referring to FIGS. 5-7, upon exertion of an external stimulus of sufficient magnitude (such as a force or temperature of sufficient magnitude), the split connection 150 (shown in FIGS. 1-4) breaks, and the first and second portions 110 and 112 of the curling members 102 split apart at the weakened areas 114 (shown in FIG. 1). As such, the curling sections 140 above the gap 120 outwardly curl, thereby outwardly curling the first and second portions 134 and 136 of the cover layer 106 away from each other. As such, an enlarged separation gap 170 over the gap 120 is formed between the first and second portions 134 and 136, clearly, noticeably, and unambiguously providing a visual indication of tampering. The outwardly-curled first and second portions 134 and 136 and the enlarged separation gap 170 indicates that the tamper-evincing seal assembly 100 is in the tampered state.

As indicated, exertion of the external stimulus of a sufficient, predetermined magnitude causes the split connection 150 and the weakened areas 114 to break. The split connection 150 may include the split connection formed on the cover layer 106 and the weakened areas 114 of the curling members 102. In at least one embodiment, the weakened areas 114 of the curling members 102 provide the split connection. In at least one embodiment, the external stimulus is an opening force between portions of the component 200 (shown in FIG. 4), such as an opening of a door relative to a fixed structure. In at least one other embodiment, the external stimulus is a temperature above a predetermined threshold. In such an embodiment, the curling member(s) 102 may be shape memory alloys that curl up when the temperature exceeds the predetermined threshold. In at least one other embodiment, the external stimulus is a pressure above a predetermined threshold. For example, the pressure may be a pressing force exerted onto, into, across, or along the tamper-evincing seal assembly 100.

Figure 8:
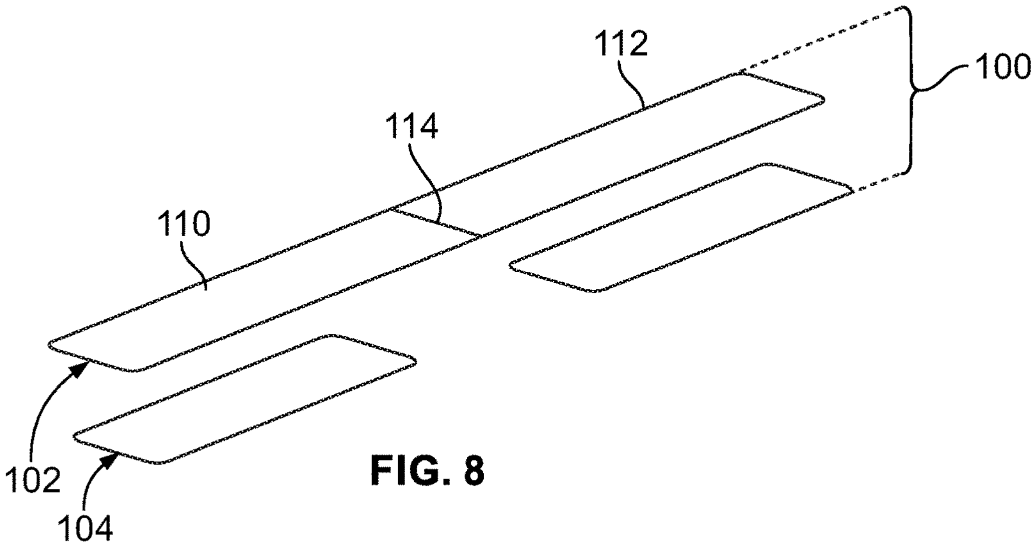
FIG. 8 is a diagrammatic representation of a top perspective exploded view of a tamper-evincing seal assembly, according to an exemplary embodiment of the present disclosure.
Figure 9:
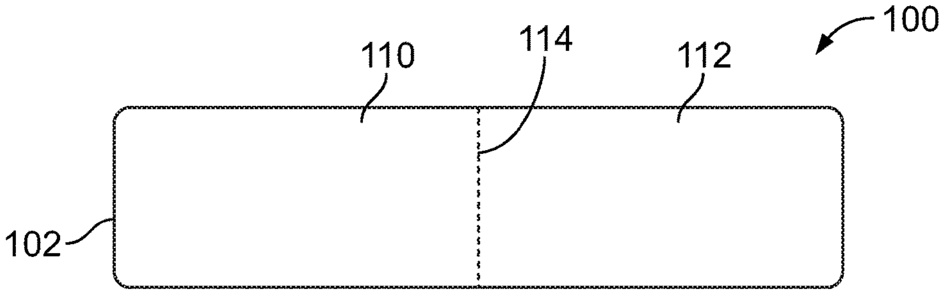
FIG. 9 is a diagrammatic representation of a top view of a tamper-free tamper-evincing seal assembly, according to an exemplary embodiment of the present disclosure.
Figure 10:
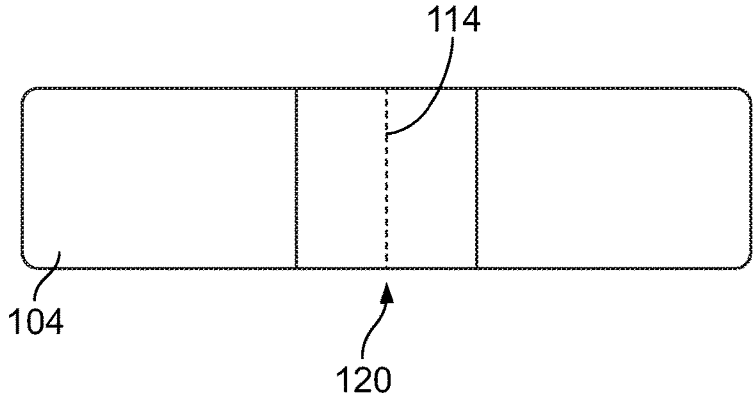
FIG. 10 is a diagrammatic representation of a bottom view of a tamper-free tamper-evincing seal assembly, according to an exemplary embodiment of the present disclosure.
Figure 11:
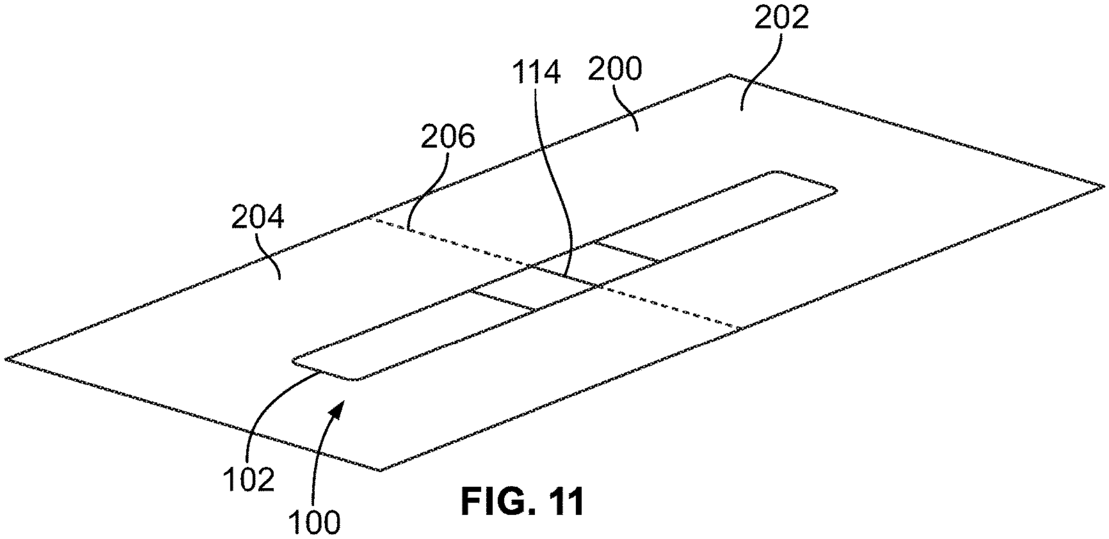
FIG. 11 is a diagrammatic representation of a top perspective view of a tamper-evincing seal assembly secured to a component in a tamper-free state, according to an exemplary embodiment of the present disclosure.
Figure 12:
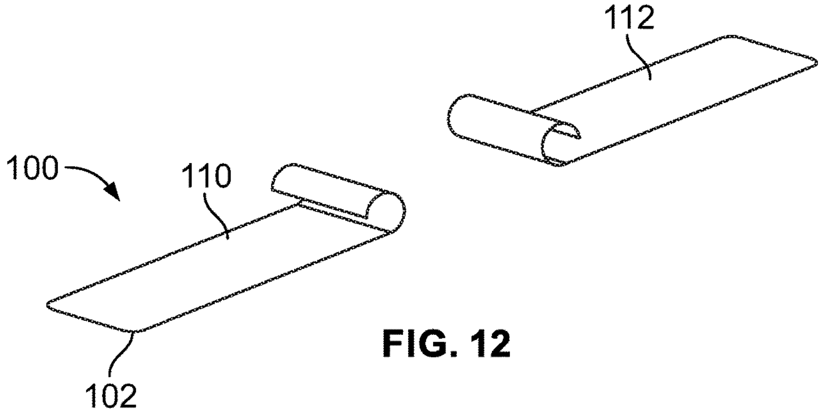
FIG. 12 is a diagrammatic representation of a top perspective view of a tamper-evincing seal assembly in a tampered state, according to an exemplary embodiment of the present disclosure.
Figure 13:
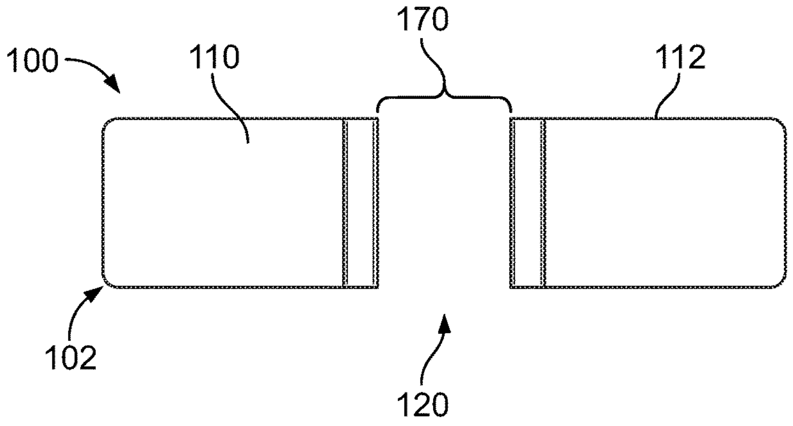
FIG. 13 is a diagrammatic representation of a top view of a tamper-evincing seal assembly in a tampered state, according to an exemplary embodiment of the present disclosure.
Figure 14:
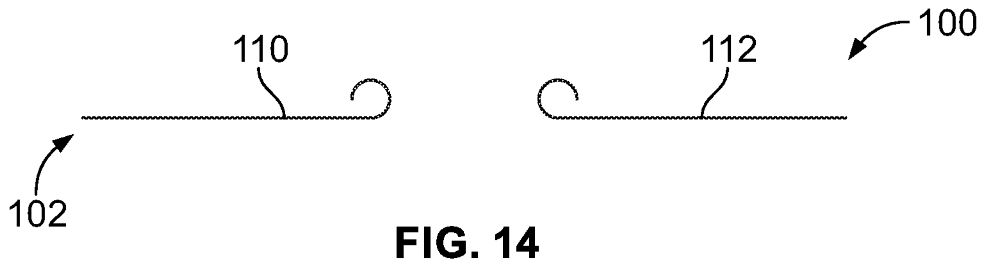
FIG. 14 is a diagrammatic representation of a lateral view of a tamper-evincing seal assembly in a tampered state, according to an exemplary embodiment of the present disclosure.

FIG. 8 is a diagrammatic representation of a top perspective exploded view of a tamper-evincing seal assembly 100, according to an exemplary embodiment of the present disclosure. FIG. 9 is a diagrammatic representation of a top view of the tamper-free tamper-evincing seal assembly 100. FIG. 10 is a diagrammatic representation of a bottom view of the tamper-free tamper-evincing seal assembly 100. FIG. 11 is a diagrammatic representation of a top perspective view of the tamper-evincing seal assembly 100 secured to a component 200 in a tamper-free state. FIG. 12 is a diagrammatic representation of a top perspective view of the tamper-evincing seal assembly 100 in a tampered state. FIG. 13 is a diagrammatic representation of a top view of the tamper-evincing seal assembly 100 in the tampered state. FIG. 14 is a diagrammatic representation of a lateral view of the tamper-evincing seal assembly 100 in the tampered state.

The tamper-evincing seal assembly 100 shown in FIGS. 8-14 is similar to that shown in FIGS. 1-7, except that the tamper-evincing seal assembly 100 may not include a cover layer. Instead, a single curling member 102 having a weakened area 114 defining a split connection overlays portions of the adhesive layer 104. The weakened area 114 provides a split connection. Optionally, the single curling member 102 shown in FIG. 8 may be or otherwise provide a cover layer including one or more embedded curling members.

Figure 15:
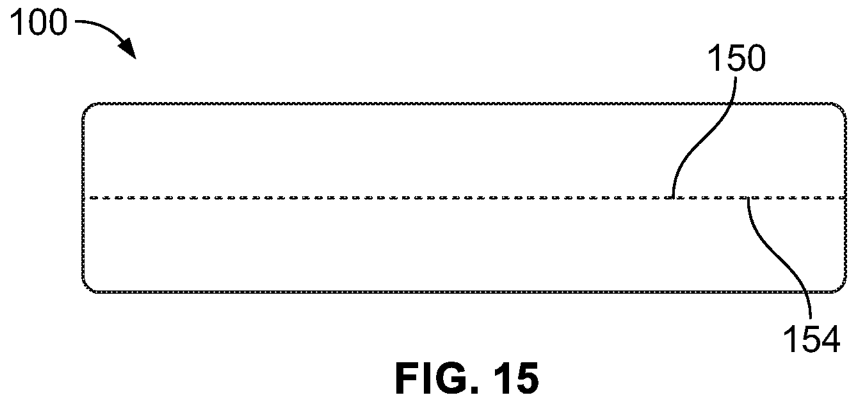
FIG. 15 is a diagrammatic representation of a top view of a tamper-evincing seal assembly, according to an exemplary embodiment of the present disclosure.

FIG. 15 is a diagrammatic representation of a top view of a tamper-evincing seal assembly 100, according to an exemplary embodiment of the present disclosure. In this embodiment, when an external tampering stimulus is exerted, the tamper-evincing seal assembly 100 is configured to curl apart about a split connection 150 that is parallel with the longitudinal axis 154. Any of the embodiments described herein may include multiple split connections 150.

Figure 16:
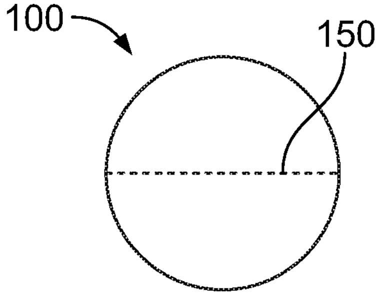
FIG. 16 is a diagrammatic representation of a top view of a tamper-evincing seal assembly, according to an exemplary embodiment of the present disclosure.

FIG. 16 is a diagrammatic representation of a top view of a tamper-evincing seal assembly 100, according to an exemplary embodiment of the present disclosure. In this embodiment, the tamper-evincing seal assembly 100 may be shaped as a circle, instead of a linear strip.

Figure 17:
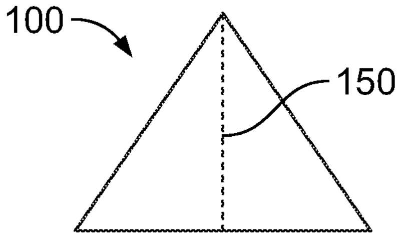
FIG. 17 is a diagrammatic representation of a top view of a tamper-evincing seal assembly, according to an exemplary embodiment of the present disclosure.

FIG. 17 is a diagrammatic representation of a top view of a tamper-evincing seal assembly 100, according to an exemplary embodiment of the present disclosure. In this embodiment, the tamper-evincing seal assembly 100 may be shaped as a triangle.

Referring to FIGS. 1-17, the tamper-evincing seal assembly 100 may be sized and shaped as desired. The tamper-evincing seal assembly 100 may be sized and shaped other than shown. For example, the tamper-evincing seal assembly 100 may be shaped as a desired figure, letter, number, graphic, or the like.

Figure 18:
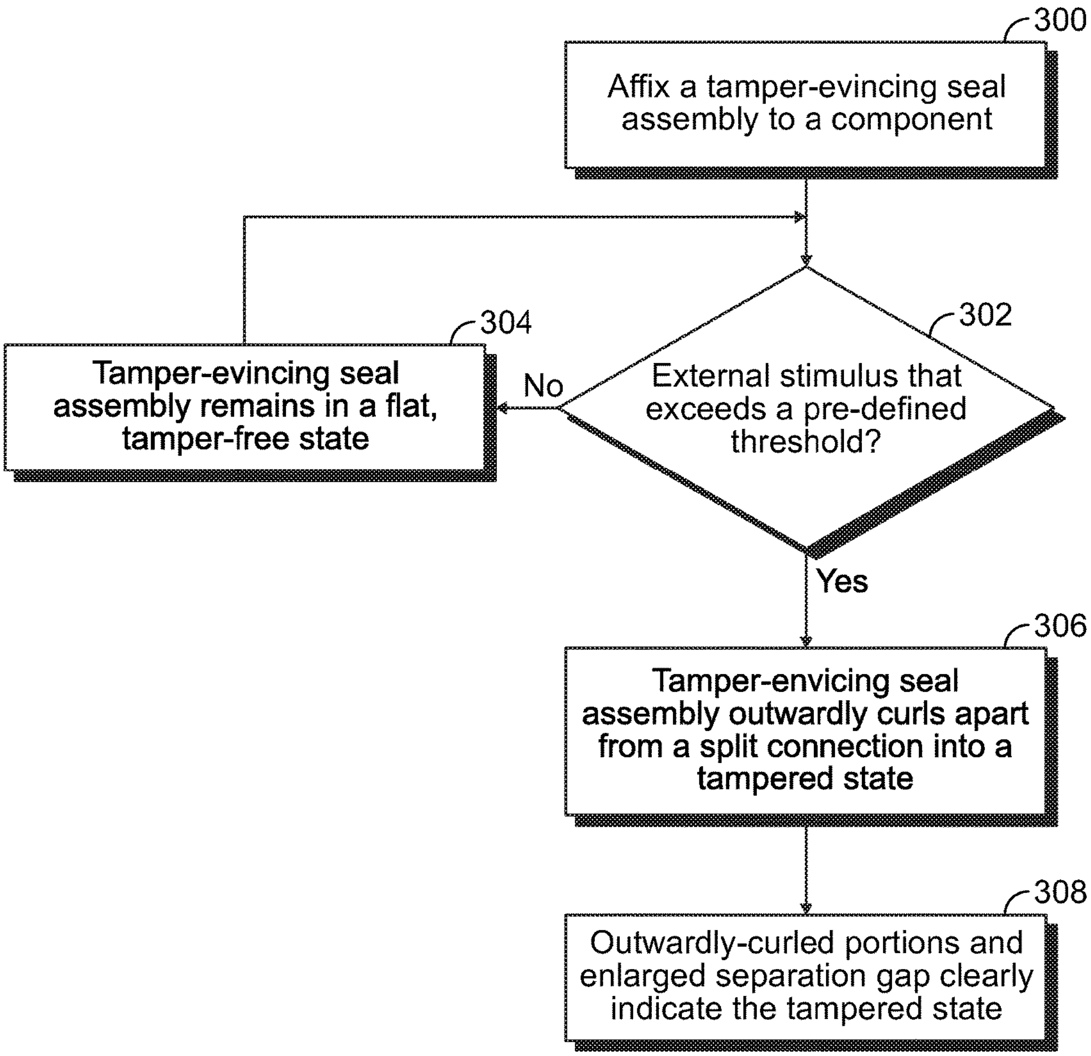
FIG. 18 illustrates a flow chart of a method of using a tamper-evincing seal assembly to provide a clear visual indication of tampering of a component, according to an embodiment of the present disclosure.

FIG. 18 illustrates a flow chart of a method of using a tamper-evincing seal assembly to provide a clear visual indication of tampering of a component, according to an embodiment of the present disclosure. Referring to FIGS. 1-18, the method begins at 300, at which a tamper-evincing seal assembly 100 is affixed to a component 200. At 302, it is determined whether there is an external stimulus (such as one or more of a separating force, pressure, and/or temperature) that exceeds a pre-defined threshold. The pre-defined threshold is determined by a strength of the split connection 150, for example, and a desired amount of stimulus at which the split connection 150 is supposed to split. If, at 302, the external stimulus does not exceed the pre-defined threshold, the method proceeds to 304, at which the tamper-evincing seal assembly 100 remains in a flat, tamper-free state.

If, however, the external stimulus exceeds the pre-defined threshold at 302, the method proceeds to 306, at which the tamper-evincing seal assembly 100 outwardly curls apart from the split connection 150 into a tampered state. At 308, the outwardly-curled portions (which may include contrasting colors in relation to the tamper-evincing seal assembly 100 in a flattened state) and enlarged separation gap 170 clearly indicate the tampered state, which is readily and easily recognized by an individual.

As described herein, embodiments of the present disclosure provide tamper-evincing seal assemblies, systems, and methods that provide tampering indications that are readily discernable.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A tamper-evincing seal assembly that is configured to be secured to a component to indicate tampering of the component, the tamper-evincing seal assembly comprising:
- a curling member that lies flat in a tamper-free state, and outwardly curls in a tampered state,
- wherein the curling member comprises a first portion and a second portion, wherein the first portion and the second portion outwardly curl away from each other in the tampered state.

2. The tamper-evincing seal assembly of claim 1, wherein the curling member comprises one or more of a spring member or a shape memory alloy.

3. The tamper-evincing seal assembly of claim 1, wherein the outwardly curled first and second portions are separated by an expanded separation gap in the tampered state.

4. The tamper-evincing seal assembly of claim 1, wherein the first portion is connected to the second portion in the tamper-free state, and wherein the first portion disconnects from the second portion in the tampered state.

5. The tamper-evincing seal assembly of claim 1, wherein the first portion connects to the second portion at a weakened area in the tamper-free state, and wherein the weakened area is broken in the tampered state.

6. The tamper-evincing seal assembly of claim 1, further comprising a cover layer having a split connection, wherein the split connection splits open in the tampered state.

7. The tamper-evincing seal assembly of claim 6, wherein the cover layer overlays the curling member in the tamper-free state, and wherein the curling member causes the cover layer to outwardly curl as the split connection splits open in the tampered state.

8. The tamper-evincing seal assembly of claim 6, wherein the curling member is embedded in the cover layer.

9. The tamper-evincing seal assembly of claim 1, further comprising an adhesive layer that is configured to secure the curling member to the component.

10. The tamper-evincing seal assembly of claim 9, wherein the adhesive layer comprises:
- a first substrate; and
- a second substrate separated from the first substrate by a gap, wherein anchored sections of the curling member are mounted on the first and second substrates, and wherein curling sections of the curling member are over the gap in the tamper-free state.

11. The tamper-evincing seal assembly of claim 1, further comprising:
- a first indicator indicative of the tamper-free state when exposed; and
- a second indicator indicative of the tampered state when exposed.

12. The tamper-evincing seal assembly of claim 11, wherein the first indicator is on a first surface of the curling member, and wherein the second indicator is on a second surface of the curling member that is opposite from the first surface.

13. The tamper-evincing seal assembly of claim 1, wherein the curling member is configured to outwardly curl in response to exertion of an external stimulus of predetermined magnitude, wherein the external stimulus is one or more of a force or temperature.

14. A tamper-evincing seal assembly that is configured to be secured to a component to indicate tampering of the component, the tamper-evincing seal assembly comprising:
- a curling member that lies flat in a tamper-free state, and outwardly curls in a tampered state, wherein the curling member comprises a first portion and a second portion, wherein the first portion and the second portion outwardly curl away from each other in the tampered state, wherein the outwardly curled first and second portions are separated by an expanded separation gap in the tampered state;
- a cover layer having a split connection, wherein the split connection splits open in the tampered state, wherein the curling member causes the cover layer to outwardly curl as the split connection splits open in the tampered state;
- an adhesive layer that is configured to secure the curling member to the component, wherein the adhesive layer comprises a first substrate, and a second substrate separated from the first substrate by a gap, wherein anchored sections of the curling member are mounted on the first and second substrates, and wherein curling sections of the curling member are over the gap in the tamper-free state;
- a first indicator indicative of the tamper-free state when exposed; and
- a second indicator indicative of the tampered state when exposed, wherein the curling member is configured to outwardly curl in response to exertion of an external stimulus, wherein the external stimulus is one or more of a force or temperature.

15. A tamper-evincing seal assembly that is configured to be secured to a component to indicate tampering of the component, the tamper-evincing seal assembly comprising:

a curling member that lies flat in a tamper-free state, and outwardly curls in a tampered state; and a cover layer having a split connection, wherein the split connection splits open in the tampered state.

16. The tamper-evincing seal assembly of claim 15, wherein the curling member comprises one or more of a spring member or a shape memory alloy.

17. The tamper-evincing seal assembly of claim 15, wherein the cover layer overlays the curling member in the tamper-free state, and wherein the curling member causes the cover layer to outwardly curl as the split connection splits open in the tampered state.

18. The tamper-evincing seal assembly of claim 15, wherein the curling member is embedded in the cover layer.

19. The tamper-evincing seal assembly of claim 15, further comprising an adhesive layer that is configured to secure the curling member to the component.

20. The tamper-evincing seal assembly of claim 19, wherein the adhesive layer comprises:

a first substrate; and a second substrate separated from the first substrate by a gap, wherein anchored sections of the curling member are mounted on the first and second substrates, and wherein curling sections of the curling member are over the gap in the tamper-free state.

21. The tamper-evincing seal assembly of claim 15, further comprising:

a first indicator indicative of the tamper-free state when exposed; and a second indicator indicative of the tampered state when exposed.

22. The tamper-evincing seal assembly of claim 21, wherein the first indicator is on a first surface of the curling member, and wherein the second indicator is on a second surface of the curling member that is opposite from the first surface.

23. The tamper-evincing seal assembly of claim 15, wherein the curling member is configured to outwardly curl in response to exertion of an external stimulus of predetermined magnitude, wherein the external stimulus is one or more of a force or temperature.

24. A tamper-evincing seal assembly that is configured to be secured to a component to indicate tampering of the component, the tamper-evincing seal assembly comprising:

a curling member that lies flat in a tamper-free state, and outwardly curls in a tampered state; and an adhesive layer that is configured to secure the curling member to the component, wherein the adhesive layer comprises:

a first substrate; and a second substrate separated from the first substrate by a gap, wherein anchored sections of the curling member are mounted on the first and second substrates, and wherein curling sections of the curling member are over the gap in the tamper-free state.

25. The tamper-evincing seal assembly of claim 24, wherein the curling member comprises one or more of a spring member or a shape memory alloy.

26. The tamper-evincing seal assembly of claim 24, further comprising:

a first indicator indicative of the tamper-free state when exposed; and a second indicator indicative of the tampered state when exposed.

27. The tamper-evincing seal assembly of claim 26, wherein the first indicator is on a first surface of the curling member, and wherein the second indicator is on a second surface of the curling member that is opposite from the first surface.

28. The tamper-evincing seal assembly of claim 24, wherein the curling member is configured to outwardly curl in response to exertion of an external stimulus of predetermined magnitude, wherein the external stimulus is one or more of a force or temperature.

29. A tamper-evincing seal assembly that is configured to be secured to a component to indicate tampering of the component, the tamper-evincing seal assembly comprising:

a curling member that lies flat in a tamper-free state, and outwardly curls in a tampered state;

a first indicator indicative of the tamper-free state when exposed, wherein the first indicator is on a first surface of the curling member; and a second indicator indicative of the tampered state when exposed, wherein the second indicator is on a second surface of the curling member that is opposite from the first surface.

30. The tamper-evincing seal assembly of claim 29, wherein the curling member comprises one or more of a spring member or a shape memory alloy.

31. The tamper-evincing seal assembly of claim 29, further comprising an adhesive layer that is configured to secure the curling member to the component.

32. The tamper-evincing seal assembly of claim 29, wherein the curling member is configured to outwardly curl in response to exertion of an external stimulus of predetermined magnitude, wherein the external stimulus is one or more of a force or temperature.

* * * * *